US008235813B2

(12) United States Patent
Cornell et al.

(10) Patent No.: US 8,235,813 B2
(45) Date of Patent: Aug. 7, 2012

(54) GAMING MACHINE HAVING AUXILIARY LIGHTING FEATURE

(75) Inventors: Bradley D. Cornell, LaGrange, IL (US); Thomas M. Kopera, Villa Park, IL (US); David J. Link, Glen Ellyn, IL (US)

(73) Assignee: WMS Gaming Inc., Waukegan, IL (US)

( * ) Notice: Subject to any disclaimer, the term of this patent is extended or adjusted under 35 U.S.C. 154(b) by 1518 days.

(21) Appl. No.: 11/498,512

(22) Filed: Aug. 3, 2006

(65) Prior Publication Data

US 2008/0039213 A1 Feb. 14, 2008

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl. ............................................ 463/31; 463/16

(58) Field of Classification Search .............. 340/323 R; 362/127, 191, 640; 463/31, 46, 47, 51, 16; 40/431, 547; 315/292, 295, 312, 318, 800

See application file for complete search history.

(56) References Cited

U.S. PATENT DOCUMENTS

| | | | | |
|---|---|---|---|---|
| 3,536,908 A * | 10/1970 | Oster | .............................. | 40/431 |
| 6,406,161 B1 * | 6/2002 | Lin et al. | .......................... | 362/85 |
| 6,965,205 B2 * | 11/2005 | Piepgras et al. | .............. | 315/318 |
| 7,390,257 B2 * | 6/2008 | Paulsen et al. | .................. | 463/16 |
| 2003/0057884 A1 * | 3/2003 | Dowling et al. | .............. | 315/291 |
| 2004/0052076 A1 * | 3/2004 | Mueller et al. | ................ | 362/293 |
| 2004/0166917 A1 | 8/2004 | Lam et al. | | |
| 2004/0166932 A1 | 8/2004 | Lam et al. | | |
| 2004/0180716 A1 * | 9/2004 | Seelig et al. | .................... | 463/20 |
| 2005/0014548 A1 | 1/2005 | Thomas | | |

FOREIGN PATENT DOCUMENTS

| | | |
|---|---|---|
| EP | 1321911 A2 | 6/2003 |
| EP | 1321911 A3 | 3/2004 |
| WO | WO 2004025578 | 3/2004 |
| WO | WO 2004075128 | 9/2004 |
| WO | WO 2005034055 | 4/2005 |

OTHER PUBLICATIONS

PokerStars.net. "Poker—Online Poker at PokerStars." http://web.archive.org/web/20041205134911/pokerstars.net/quicktour.html, Created May 2, 2004; Accessed Jul. 31, 2009.*

* cited by examiner

*Primary Examiner* — David L Lewis
*Assistant Examiner* — Reginald A Renwick
(74) *Attorney, Agent, or Firm* — Nixon Peabody LLP

(57) ABSTRACT

A gaming machine for conducting a wagering game comprises a pendant lighting assembly coupled to the gaming machine cabinet. The pendant lighting assembly includes a light source mounted to the gaming machine cabinet and at least one light conduit mounted to the gaming machine cabinet. The at least one light conduit is adjustable to direct and redirect light from the light source to one or more locations external to the gaming machine cabinet. The color and/or timing of the light directed at each location may be synchronized with events occurring in the wagering game.

20 Claims, 6 Drawing Sheets

GAMING MACHINE HAVING AUXILIARY LIGHTING FEATURE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a method and system for directing light from a light source to specific locations on such gaming machines.

BACKGROUND OF THE INVENTION

Gaming machines, such as slot machines, video poker machines and the like, have been a cornerstone of the gaming industry for years. Generally, the popularity of such machines with players depends on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Gaming machine operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "base" game. The bonus game may comprise any type of game, either similar to or completely different from the base game, which is entered upon the occurrence of a selected event or outcome in the base game. Generally, bonus games provide a greater expectation of winning than the base game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines.

Another concept that has been successfully employed to enhance player entertainment value is the use of theme-based audio and visual content in the wagering games. Examples of popular themes include board games themes (e.g., Monopoly), movie themes (e.g., Top Gun), sports themes (e.g., golf), and the like. To further enhance player entertainment value, the exterior artwork of the gaming machines may also be designed to reflect the themes in the wagering games. For example, where the themes include recognizable characters and/or objects, statues and other three-dimensional reproductions of the characters and/or objects may be prominently displayed on the gaming machines.

Unfortunately, the dim lighting in many casinos makes it difficult for the statues and other three-dimensional reproductions to be noticed unless specifically illuminated. Compounding the problem, the manufacturing methods used to produce the statues and other three-dimensional reproductions do not permit illumination from within. In some cases, lights may be mounted on the gaming machines to illuminate the statues and other three-dimensional reproductions. However, mounting lights on the exterior of the gaming machines would expose players and other casino patrons to live electrical components, thus raising potential safety problems.

Accordingly, what is needed is a way to illuminate statues and other three-dimensional reproductions of recognizable characters and/or objects on a gaming machine in order to enhance player appeal and excitement. In particular, what is needed is a way to illuminate such statues and other three-dimensional reproductions without exposing players and other casino patrons to live electrical components.

SUMMARY OF THE INVENTION

According to one aspect of the present invention, a gaming machine for conducting a wagering game comprises a wager input device for receiving a wager input from a player for playing a wagering game. The gaming machine further comprises at least one display operable to display an outcome of the wagering game, the outcome being randomly selected from a plurality of outcomes. A gaming machine cabinet houses the at least one display. A pendant lighting assembly is installed on the gaming machine cabinet. The pendant lighting assembly includes a light source and at least one optical waveguide. The at least one optical waveguide is adjustable to direct light from the light source to at least one location external to the gaming machine cabinet.

According to another aspect of the invention, a method of conducting a wagering game on a gaming system comprises receiving a wager input from a player for playing the wagering game and displaying an outcome of the wagering game, the outcome being randomly selected from a plurality of outcomes. The method further comprises activating a light source coupled to the gaming machine and conducting light from the light source through at least one optical waveguide coupled to the gaming machine.

According to yet another aspect of the invention, a gaming machine comprises a wager input device for receiving a wager input from a player for playing a wagering game. The gaming machine further comprises at least one display operable to display an outcome of the wagering game, the outcome being randomly selected from a plurality of outcomes. A gaming machine cabinet houses the at least one display and a multi-color light source is mounted on the gaming machine cabinet. At least one light guide is coupled to the gaming machine cabinet and configured to transmit light from the multi-color light source to a first location external to the gaming machine cabinet, the at least one light guide being adjustable to reposition the light to a second location external to the gaming machine cabinet.

Additional aspects of the invention will be apparent to those of ordinary skill in the art in view of the detailed description of various embodiments, which is made with reference to the drawings, a brief description of which is provided below.

DETAILED DESCRIPTION

Figure 1:
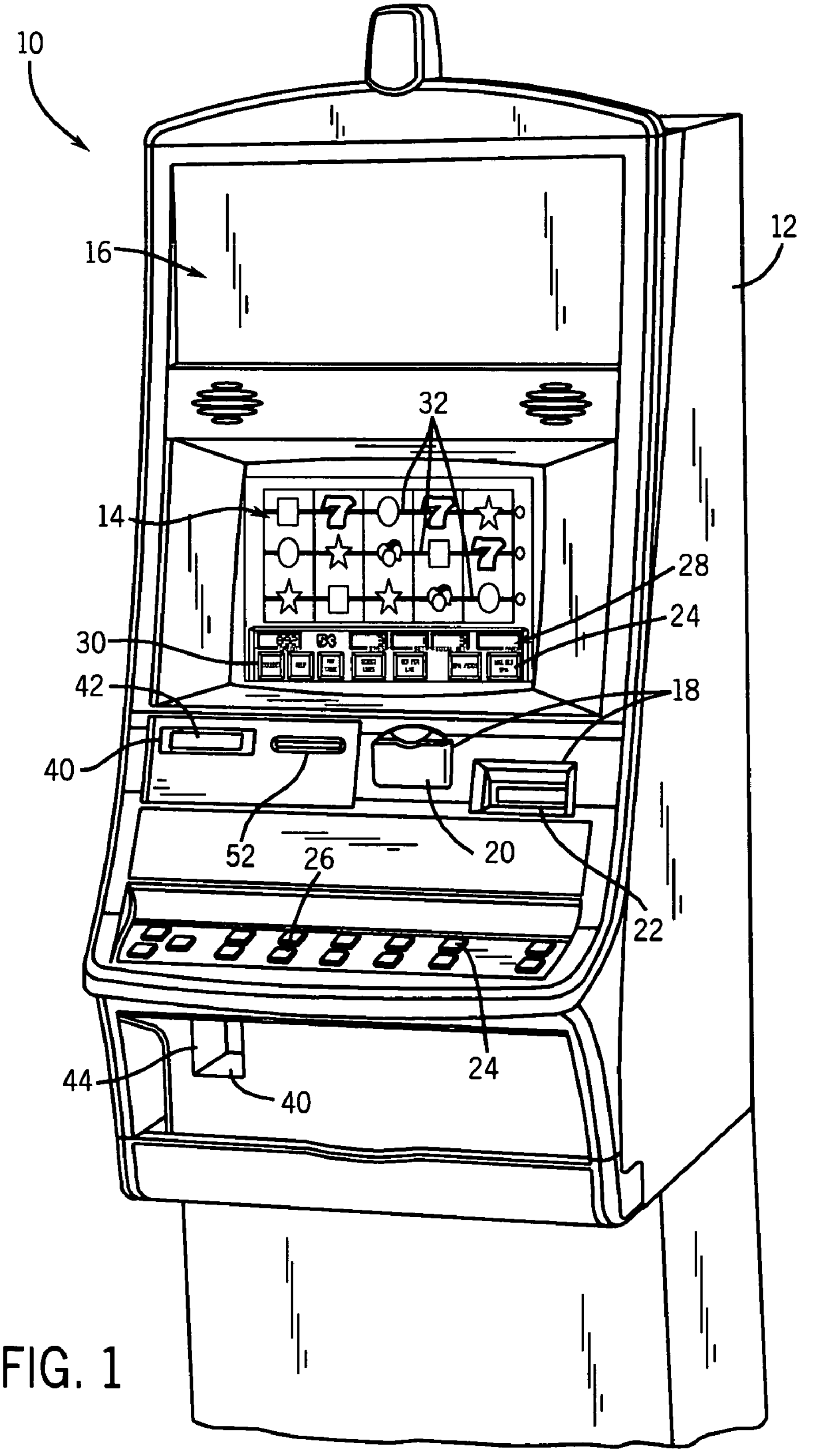
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 used in gaming establishments such as casinos is shown. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the base wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits which are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an option on how to make their game selections. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the base wagering game is displayed to the player on the primary display 14. The primary display 14 can also display the bonus game associated with the base wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the base wagering game by making a wager via the value input device 18 of the gaming machine 10. A player can select play by using the player input device 24, via the buttons 26 or the touch screen keys 30. The base game consists of a plurality of symbols arranged in an array, and includes at least one payline 32 that indicates one or more outcomes of the base game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming terminal 10. The gaming terminal 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
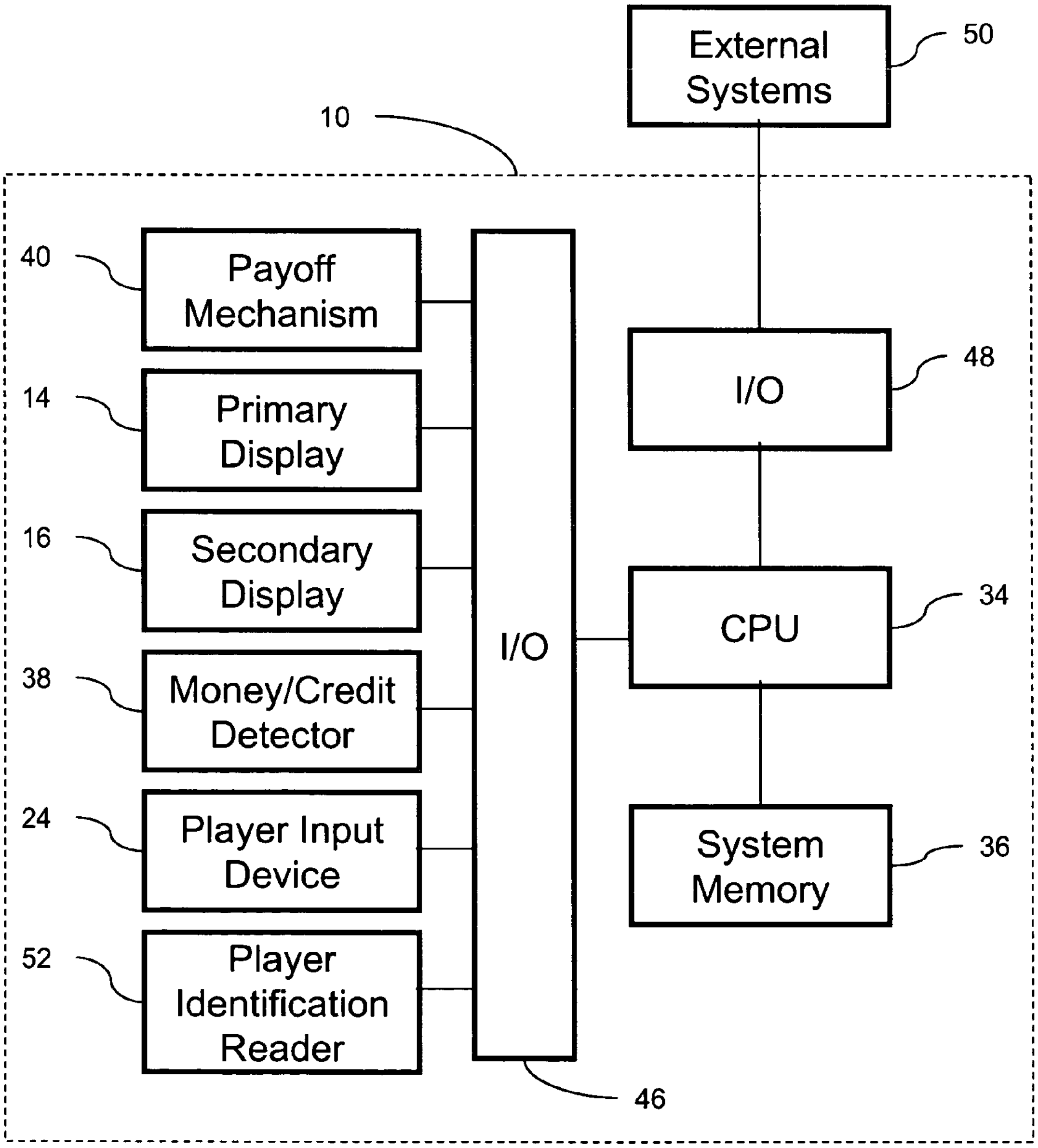
FIG. 2 is a block diagram of a control system suitable for operating the gaming machine of FIG. 1.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the base game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10 bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3B:
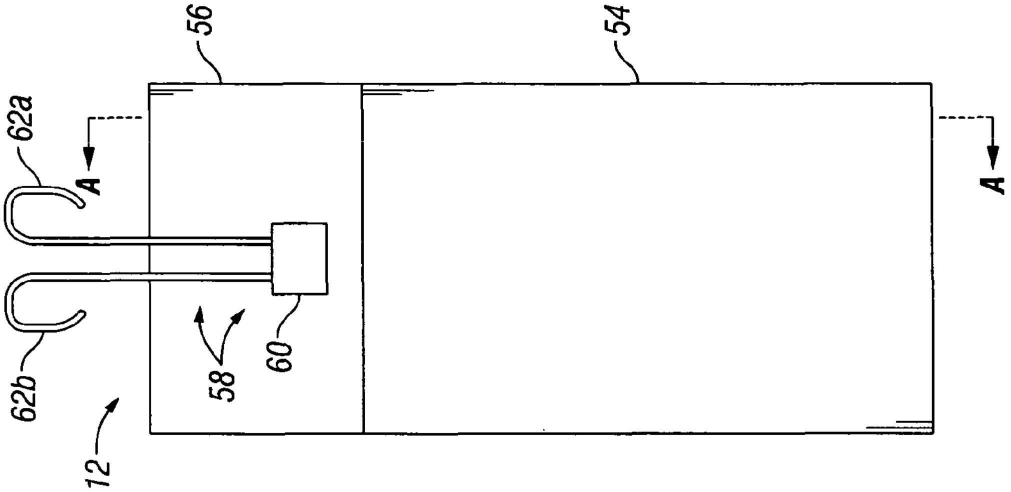
FIGS. 3A-3B are cross-sectional side and front views of a gaming machine having a lighting assembly according to embodiments of the invention.
Figure 3A:
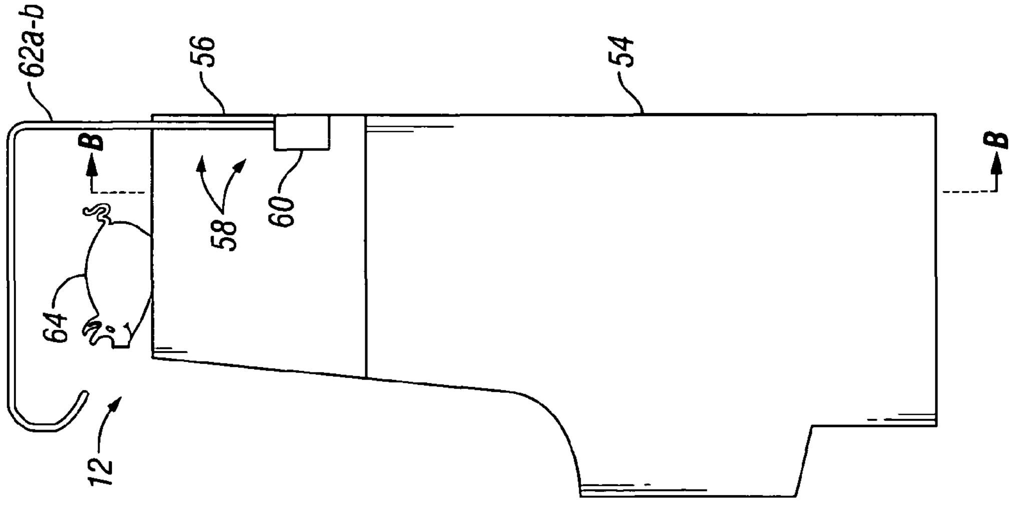

Turning now to FIGS. 3A-3B, cross-sectional side and front views are shown along lines A-A and B-B, respectively, of a gaming machine similar to the gaming machine 10 (i.e., having many of the same components). As can be seen, the gaming machine includes, among other things, a cabinet 12 composed of two sections, a main body 54 and a top box 56 mounted on the main body 54. In general, the top box 56 houses the secondary display 16 while the main body 54 houses the primary display 14 along with various electrical and mechanical components of the gaming machine. For certain gaming machines that have only one display, the top box 56 may simply house additional components.

In accordance with embodiments of the invention, the cabinet 12 of the gaming machine also includes a lighting assembly 58. The lighting assembly 58 operates to direct (and redirect) light from an internal light source to one or more locations external to the cabinet 12 to draw attention to these locations. The lighting assembly 58 is able to do this without exposing players and other patrons of the casino to live electrical components, thus avoiding potential safety and security problems. In addition, the light produced by the lighting assembly 58 may have multiple colors so that each external location may be illuminated with a different color. Furthermore, the lighting assembly 58 may be controlled so as to synchronize the color, timing, and/or location of the light with certain events occurring in the base and/or bonus game (e.g., a winning outcome, the start of a bonus game, etc.). The synchronization may be effected, for example, by the controller 34 (FIG. 2) in the gaming machine or by a separate controller, for example, on the external systems 50 or in the lighting assembly 58 itself.

In one embodiment, the lighting assembly 58 comprises a light source 60 mounted within the cabinet 12, for example, in the top box 56 or the main body 54. By concealing the light source 60 within the cabinet 12, potential safety and tampering problems as well as any related regulatory issues may be avoided. The light source 60 may be any suitable light source known to those having ordinary skill in the art, including LED (light emitting diode) based light sources as well as more conventional light sources. Furthermore, as mentioned above, the light source 60 may be a single color light source, or it may be a multi-color light source capable of producing lights having several different and distinct colors.

In addition to the light source 60, the lighting assembly 58 also comprises a plurality of light conduits 62*a* and 62*b* (only one light conduit 62*a* is visible in FIG. 3A). The light conduits 62*a-b* are optically coupled to the light source 60 and are designed to conduct the light from the light source 60 to one or more external locations. In one embodiment, the light conduits 62*a-b* extend from a point within the cabinet 12 near the light source 60 through the top of the top box 56 to thereby protrude from the cabinet 12. Preferably, the light conduits 62*a-b* are flexible or at least adjustable so that the light may be directed and redirected at specific locations as needed. Any suitable optical waveguide known to those having ordinary skill in the art may be used for the light conduits 62*a-b*, including fiber-optic cables as well as rectangular waveguides. Such a lighting arrangement is commonly referred to as "pendant lighting" because of the manner in which the light appears to be suspended or otherwise hang in midair.

In operation, various locations external to the cabinet 12 may be specifically illuminated to enhance player appeal and excitement as well as to attract passersby. The illumination may have a single color and/or it may include multiple colors employed simultaneously or sequentially to enhance player appeal and excitement. The illumination may additionally be continuous and/or it may be synchronized with the occurrence of certain events in the wagering game (or the display thereof) to further enhance player appeal and excitement. And as for the external locations, these may include locations in the surrounding area (e.g., adjacent gaming machines, overhead displays, etc.), and/or they may include locations on the exterior surface of the cabinet 12 (e.g., certain images or designs in the artwork, etc.). In some embodiments, the exterior surface of the cabinet 12 may include one or more ornamental objects 64, such as statues and other three-dimensional reproductions of well-known characters (e.g., Arnold the Pig) and/or objects appearing in the theme of the wagering game.

Figure 4:
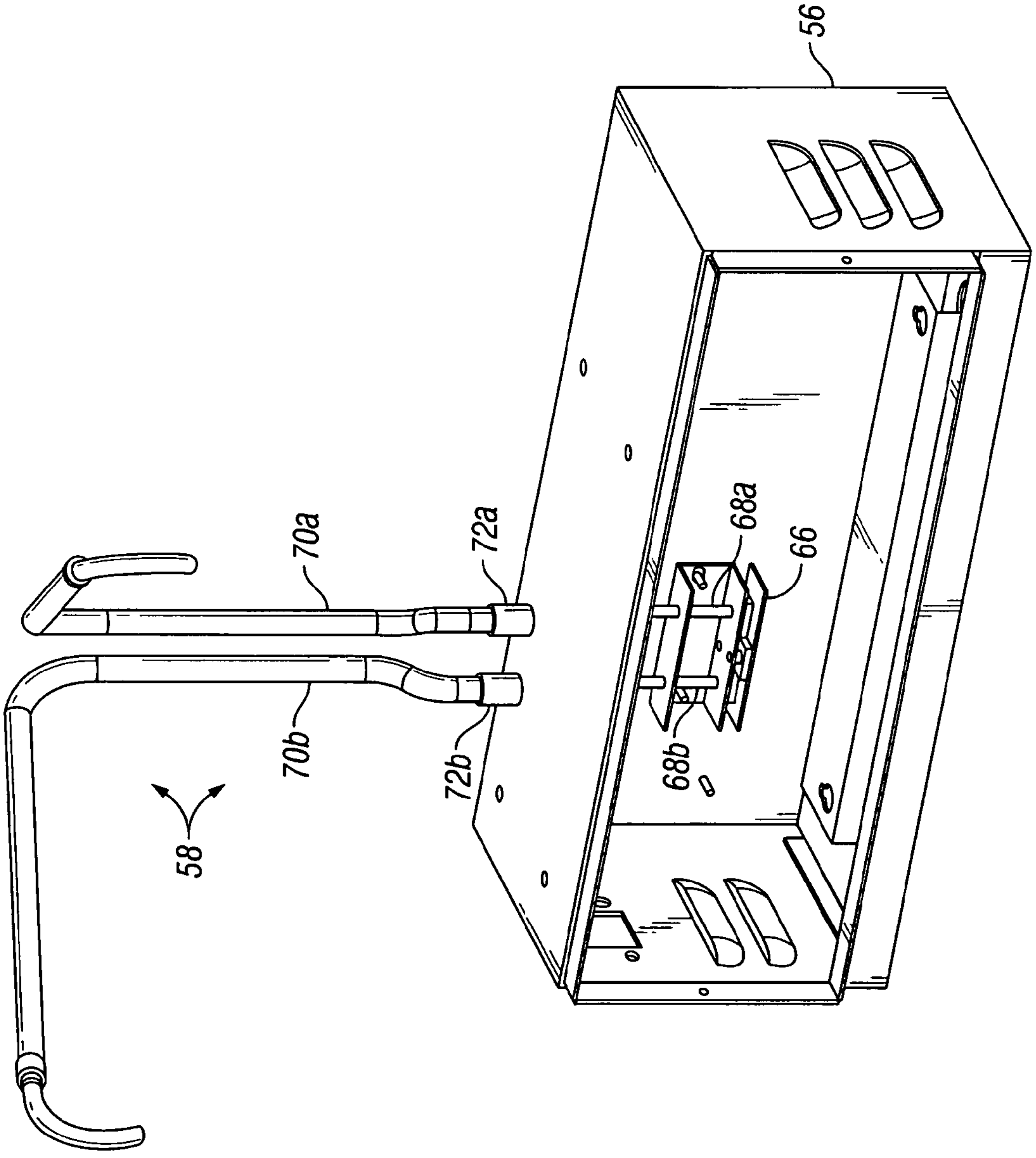
FIG. 4 is an exemplary implementation of the lighting assembly according to embodiments of the invention.
Figure 5:
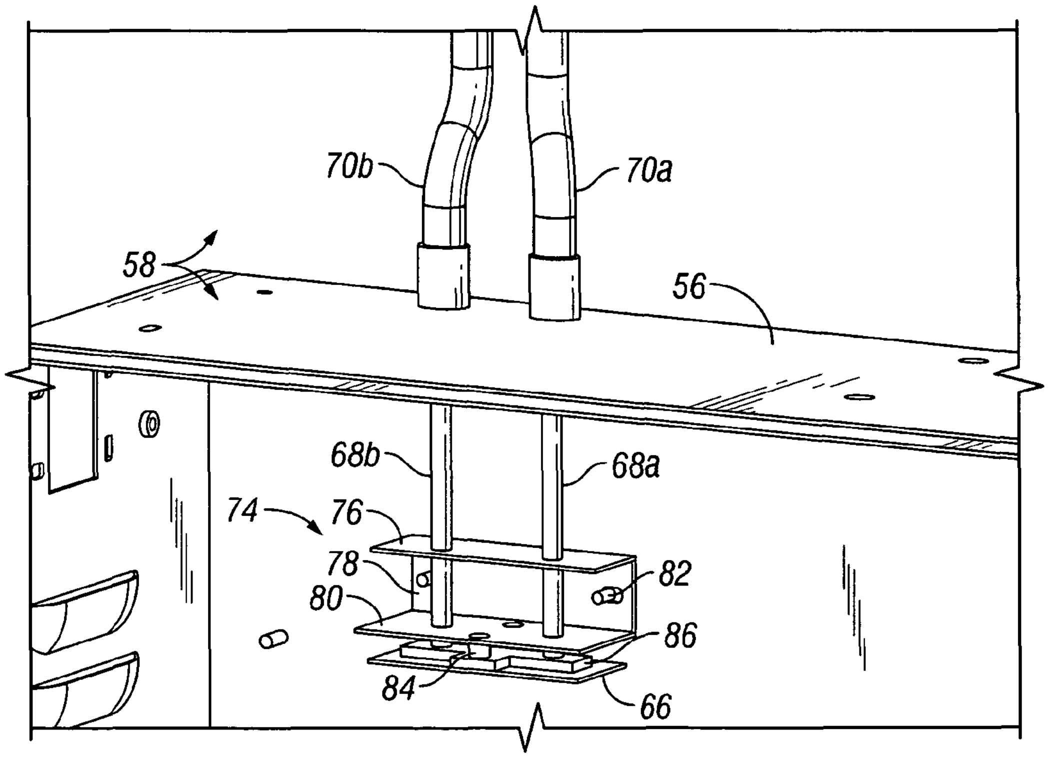
FIG. 5 is a close-up view of the lighting assembly according to embodiments of the invention.

FIGS. 4-5 illustrate a specific implementation of the lighting assembly 58 according to embodiments of the invention. Referring first to FIG. 4, in one embodiment, the lighting assembly 58 includes a light source in the form of a light board 66 mounted, for example, in the top box 56. The light board 66 may be a multi-color LED light board, such as those commercially available from, for example, Nichia Corp. of Detroit, Mich. and Cree Inc. of Durham, N.C. Other suitable multi-color light boards may be also used without departing from the scope of the invention. A plurality of fiber-optic cables 68*a* and 68*b* are optically coupled to the light board 66. The fiber-optic cables 68*a*-*b* function as optical waveguides to conduct light from the light board 66 to one or more locations external to the cabinet 12 (FIGS. 3A-3B). Each fiber-optic cable 68*a*-*b* may be single, large-diameter strand of optical fiber, or several smaller strands may be bundled together to form each fiber-optic cable 68*a*-*b*.

Also present are a plurality of pliable arms 70*a* and 70*b* that protrude from the top of the top box 56, for example, near the back thereof. The pliable arms 70*a*-*b* serve to house and support the fiber-optic cables 68*a*-*b*, which are typically too flexible to support their own weight. In one implementation, the pliable arms 70*a*-*b* extend over the top of the top box 56 and bend back around towards the top box 56. This arrangement is particularly useful for directing light to specific locations on the exterior surface of the cabinet 12. Other pliable arm arrangements may of course be used depending on the particular needs of the application. The pliable arms 70*a*-*b* may be made of any light weight material, such as aluminum tubing, that can retain a given shape, turn, angle, and so forth. Furthermore, each pliable arm 70*a*-*b* may be one continuous piece, or it may be composed of several sections joined together. Threaded ends 72*a* and 72*b* on the pliable arms 70*a*-*b* allow them to be screwed to the top box 56 via threaded openings (not shown) in the top box 56. These same threaded openings allow the fiber-optic cables 68*a*-*b* to pass through the top box 56 and extend to the light board 66.

FIG. 5 illustrates a close-up view of the implementation of FIG. 4. As can be seen more clearly here, a mounting bracket 74 is provided for mounting the light board 66 to the top box 56. The mounting bracket 74, which may be made of any material suitable for the purpose (e.g., sheet metal), includes a top plate 76, a back plate 78, and a bottom plate 80. A plurality of screws 82 secures the back plate 78 (and hence the mounting bracket 74) to the top box 56. Other attachment means may of course be used (e.g., rivets, welding, adhesive, etc.) without departing from the scope of the invention. One or more additional screws 84 (or other suitable mounting means) secure the light board 66 to the bottom plate 80 of the mounting bracket 74. Concentric holes in the top plate 76 and the bottom plate 80 allow the fiber-optic cables 68*a*-*b* to extend to, and thus be optically coupled with, the light board 66.

In some embodiments, a spacer 86 is disposed between the light board 66 and the bottom plate 80 to space apart the fiber-optic cables 68*a*-*b* from the lighting elements (e.g., LED) of the light board 66. Specifically, openings (not visible here) in the spacer 86 concentric with the lighting elements, but having a diameter slightly smaller than the inner diameter of the fiber-optic cables 68*a*-*b*, allow light from the lighting elements to shine through to the fiber-optic cables 68*a*-*b* while stopping them from touching the lighting elements. As with other components, the spacer 86 may be made of any material suitable for the purpose (e.g., plastic).

The foregoing embodiments have the lighting assembly installed inside the cabinet in order to avoid potential safety issues (e.g., players and patrons contact him live electrical components, etc.). However, an internally-mounted lighting assembly may not be feasible for certain gaming machines (e.g., gaming machines that are already deployed on the casino floor). Accordingly, embodiments of the invention also contemplate a lighting assembly that may be installed outside the cabinet. The electrical components of such an externally-mounted lighting assembly may then be enclosed within a locked and/or tamperproof enclosure to shield players and patrons from inadvertent or deliberate contact. The lighting assembly may then be used to retrofit existing gaming machines or gaming machines that are otherwise unable to house an internally-mounted lighting assembly.

Figure 6:
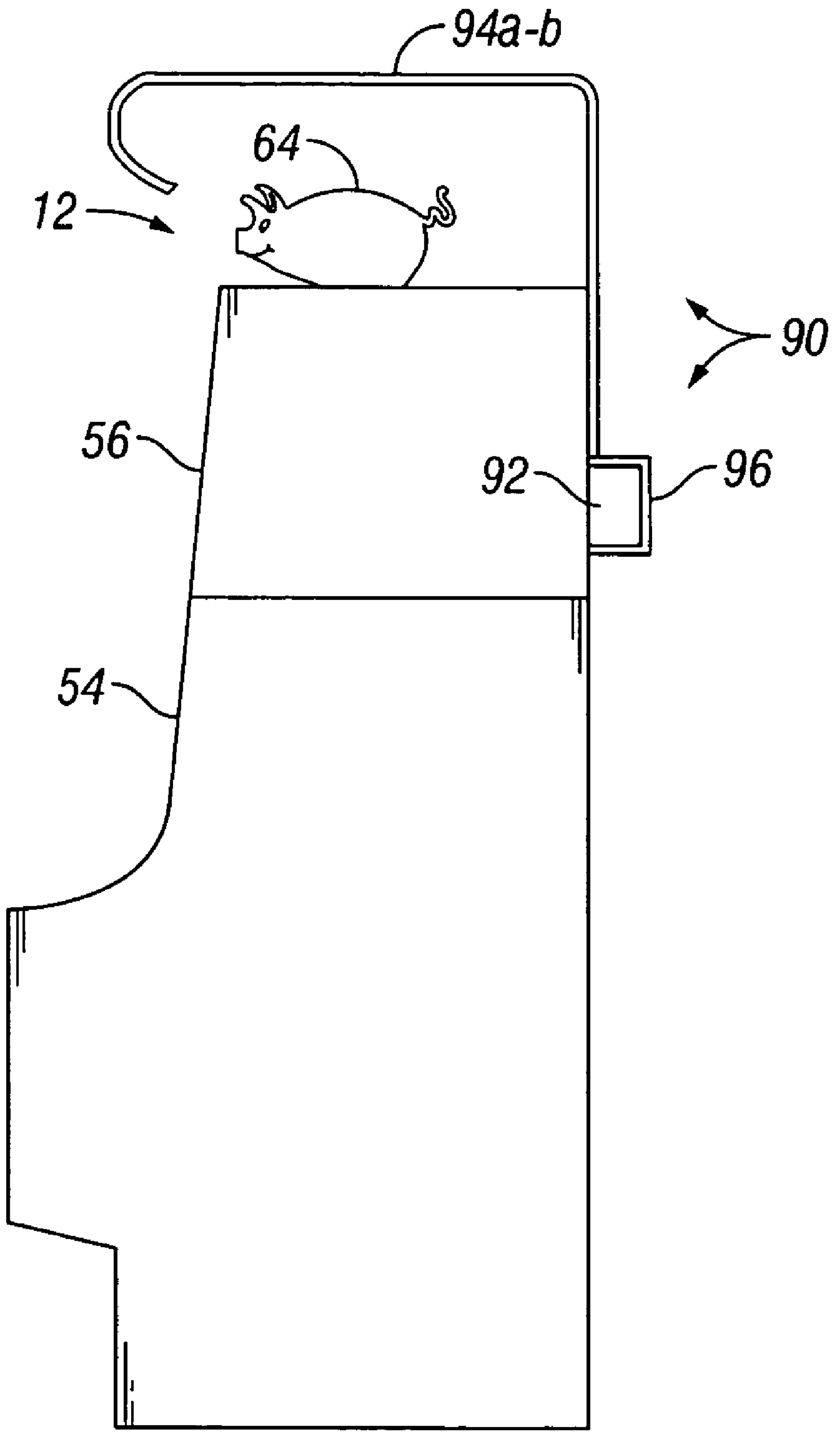
FIG. 6 is a cross-sectional view of a gaming machine having an alternative lighting assembly according to embodiments of the invention.

FIG. 6 illustrates an exemplary externally-mounted lighting assembly 90 according to embodiments of the invention. The lighting assembly 90 is similar to the lighting assembly 58 of FIGS. 3A-3B insofar as it includes a light source 92 and a plurality of light conduits 94*a* and 94*b* (only one light conduit 94*a* is visible here). These components 92 and 94*a*-*b* of the lighting assembly 90 are similar to their counterparts 60 and 62*a*-*b* of the lighting assembly 58 and will therefore not be described in detail here. However, instead of being mounted inside the cabinet 12, the lighting assembly 90 is mounted external to the cabinet 12. In one embodiment, the lighting assembly 90 is mounted on the external back surface of the cabinet 12, either on the main body 54 or the top box 56. In other embodiments, the lighting assembly 90 may be mounted on a different external surface, a nearby wall, or even an adjacent gaming machine (not expressly shown). Furthermore, in some embodiments, a lockable and/or tamperproof enclosure 96 may be used to enclose the light source 90. The lockable and/or tamperproof enclosure 96 may be any enclosure known to those having ordinary skill in the art that is capable of preventing players and passersby from inadvertently and/or deliberately contacting the light source 90. Such a lighting assembly 90 may then be used to direct (and redirect) light at one or more locations and/or ornamental objects 64 (e.g., Arnold the Pig) external to the cabinet 12 to enhance player enjoyment and excitement as well as attract passersby. As in the previous embodiments, the light produced by the lighting assembly 90 may have multiple colors so that each external location may be illuminated with a different color. Furthermore, the lighting assembly 90 may be controlled so as to synchronize the color, timing, and/or location of the light with certain events occurring in the base and/or bonus game (e.g., a winning outcome, the start of a bonus game, etc.).

While the invention has been described with reference to one or more particular embodiments, those skilled in the art will recognize that many changes may be made thereto without departing from the spirit and scope of the invention.

Accordingly, each of these embodiments and obvious variations thereof is contemplated as falling within the spirit and scope of the invention, which is set forth in the following claims.

What is claimed is:

1. A gaming machine, comprising:

a wager input device configured to receive a wager input from a player for playing a wagering game;

at least one display operable to display an outcome of said wagering game, said outcome being randomly selected from a plurality of outcomes;

a gaming machine cabinet housing said at least one display;

at least one ornamental object mounted on a forward external portion of said gaming machine cabinet; and a pendant lighting assembly having a light source in optical communication with at least one optical waveguide, said light source being positioned at a first location proximate a rear portion of said gaming machine cabinet and within at least one of said gaming machine cabinet and an enclosure mounted on said gaming machine cabinet, said at least one optical waveguide extending around said gaming machine cabinet from said rear portion to said forward portion and directing light from said light source at said first location to at least a second location onto the at least one ornamental object.

2. The gaming machine according to claim 1, wherein said light source is enclosed entirely within said gaming machine cabinet.

3. The gaming machine according to claim 1, wherein said at least one optical waveguide extends into and protrudes from said at least one of said gaming machine cabinet and said enclosure mounted on said gaming machine cabinet.

4. The gaming machine according to claim 1, wherein said light source is enclosed entirely within said enclosure, and said enclosure is mounted to an outside surface of said gaming machine cabinet.

5. The gaming machine according to claim 1, wherein said at least one optical waveguide comprises one of a fiber-optic cable and a rectangular waveguide.

6. The gaming machine according to claim 1, wherein said pendant lighting assembly further includes at least one pliable arm coupled to said gaming machine cabinet, said at least one pliable arm housing therein said at least one optical waveguide, said at least one pliable arm being configured to selectively reposition said at least one optical waveguide between said second location and at least a third location.

7. A gaming machine comprising:

a gaming machine cabinet;

a wager input device configured to receive a wager from a player to thereby initiate a wagering game;

at least one display operable to display outcomes of said wagering game;

a light source positioned at a first location within at least one of said gaming machine cabinet and an enclosure mounted on said gaming machine cabinet;

at least one optical waveguide in optical communication with said light source; and at least one ornamental object mounted on an external portion of said gaming machine cabinet at a second location remote from said first location, wherein said at least one optical waveguide transmits light from said light source to said second location and diffuses a substantial portion of said light from said light source onto said at least one ornamental object.

8. The gaming machine according to claim 1, wherein said light source is a multi-color light source operable to produce different colors for said light based on said outcome of said wagering game.

9. A method of conducting a wagering game on a gaming machine, the method comprising:

receiving a wager input from a player for playing said wagering game;

displaying an outcome of said wagering game, said outcome being randomly selected from a plurality of outcomes;

activating a light source enclosed at a first location of said gaming machine;

conducting light from said light source at said first location through at least one optical waveguide to a second location remote from said first location and external to a cabinet of said gaming machine; and diffusing a substantial portion of said light from said light source onto an ornamental object mounted on said gaming machine at said external second location.

10. The method according to claim 9, further comprising changing a color of said light conducted through said at least one optical waveguide based on said outcome of said wagering game.

11. The method according to claim 9, further comprising synchronizing a timing of said light conducted through said at least one optical waveguide with said displaying of said outcome of said wagering game.

12. The method according to claim 9, wherein said light source is enclosed entirely within said gaming machine cabinet.

13. A gaming machine, comprising:

a wager input device for receiving a wager input from a player for playing a wagering game;

at least one display operable to display an outcome of said wagering game, said outcome being randomly selected from a plurality of outcomes;

a gaming machine cabinet for housing said at least one display;

a multi-color light source positioned at an internal location within one of said gaming machine cabinet and an enclosure mounted on said gaming machine cabinet;

at least one ornamental object mounted at an external location of said gaming machine cabinet;

at least one optical light guide coupled to said gaming machine cabinet and configured to transmit light from said internal location of said multi-color light source to said external location of said gaming machine cabinet, said at least one light guide being repositionable to diffuse light onto a plurality of distinct locations external to said gaming machine cabinet; and at least one pliable arm coupled to said gaming machine cabinet, said at least one optical light guide being housed within said at least one pliable arm, said at least one pliable arm being configured to selectively reposition said at least one optical light guide between said plurality of distinct external locations.

14. The gaming machine according to claim 13, further comprising a controller operable to change a color of said multi-color light source for said at least one light guide based on said outcome of said wagering game.

15. The gaming machine according to claim 13, wherein said plurality of distinct locations comprise locations on an exterior surface of said gaming machine cabinet.

16. The gaming machine according to claim 13, further comprising at least one mounting bracket mounting said light source and said at least one optical light guide to said one of said gaming machine cabinet and said enclosure.

17. The gaming machine according to claim 13, said at least one light guide diffusing a substantial portion of said light from said light source onto said at least one ornamental object.

18. The gaming machine according to claim 13, wherein said multi-color light source comprises a light board having a plurality of light emitting diodes thereon.

19. The gaming machine according to claim 13, further comprising an interface for spacing apart said multi-color light source from said at least one light guide.

20. The gaming machine according to claim 13, wherein said at least one light guide comprises one of a fiber-optic cable and a rectangular waveguide.

* * * * *